United States Patent

Hammon

[15] 3,642,294

[45] Feb. 15, 1972

[54] WASHER

[72] Inventor: George L. Hammon, Oakland, Calif.

[73] Assignee: Chemetron Corporation, Chicago, Ill.

[22] Filed: Jan. 29, 1970

[21] Appl. No.: 6,655

[52] U.S. Cl. .......................................................277/207
[51] Int. Cl. ......................................................F16j 15/10
[58] Field of Search ......................................277/207–211

[56] References Cited

UNITED STATES PATENTS

| 1,869,577 | 8/1932 | Oberhuber | 277/211 |
| 2,244,135 | 6/1941 | Wallace | 277/209 |
| 2,802,503 | 8/1957 | Zupa | 277/209 |

FOREIGN PATENTS OR APPLICATIONS

| 129,632 | 9/1932 | Austria | 277/211 |

Primary Examiner—Robert I. Smith
Assistant Examiner—Robert I. Smith
Attorney—Nicholas M. Esser

[57] ABSTRACT

A one-piece annular washer of resiliently deformable material has in at least one of its opposite faces radially outer and inner coaxial annular grooves which together with the axial opening of the washer form radially outer and inner coaxial annular skirt portions of generally triangular cross section. Preferably, the washer further has similar skirt portions formed on the other of its opposite faces and an annular fin generally axially extended from the radially inner skirt portion on one of its opposite faces.

12 Claims, 4 Drawing Figures

PATENTED FEB 15 1972 3,642,294

Inventor
George L. Hammon
By _____
Attorney

3,642,294

WASHER

BACKGROUND OF THE INVENTION

This invention pertains to an improved washer having particular utility in making high-pressure gastight connections, whether between hand-tightened parts or between wrench-tightened parts, as between a gas pressure regulator or other flow control device and a cylinder containing medical oxygen or other gas under high pressure.

Conventionally, in connecting a gas pressure regulator or other flow control device to a cylinder containing medical oxygen or gas under high pressure, a valve body incorporating suitable valve means for selectively permitting and stopping flow of the gas from the cylinder is threadably mounted to the cylinder, and a stem having a nipple adapted to be drawn into a valve outlet opening in the valve body is threadably connected to the gas pressure regulator or other flow control device. Suitable means are used to mount the stem to the valve body such that the nipple is drawn into the valve outlet opening. An example of a swivel yoke useful in mounting the stem to the valve body is described in a copending Pat. application, Ser. No. 812,183, filed Apr. 1, 1969, and assigned to the assignee of the present application. As shown therein, in order to make a high-pressure gastight connection a threaded stud is used to draw the nipple into the valve outlet opening, and a flat-faced washer of nylon or other resiliently deformable material is disposed around the nipple between an enlarged head of the stem and margin of the valve outlet opening. With known flat-faced washers for this purpose, hand tightening of the threaded stud may not be adequate. Unless a wrench or other tool is used to tighten the threaded stud, leakage may occur between the opposite flat faces of the washer and the respective washer-engaging surface of the enlarged head of the stem and of the margin of the valve outlet opening.

The preceding example illustrates a need for an improved washer having particular utility in making high-pressure gastight connections, whether between hand-tightened parts or between wrench-tightened parts, as between a gas pressure regulator or other flow control device and a cylinder containing medical oxygen or other gas under high pressure.

SUMMARY OF THE INVENTION

It is the principal object of this invention to provide an improved washer as aforementioned.

It is a more particular object of this invention to provide an improved washer useful in making a high-pressure gastight connection between a gas pressure regulator or other flow control device and a cylinder containing medical oxygen or other gas under high pressure.

In accordance with the principles of this invention, the preceding objects may be attained in a one-piece washer of resiliently deformable material having in at least one of its opposite faces radially outer and inner coaxial annular grooves which together with the axial opening of the washer form generally axially extending radially outer and inner skirt portions of generally triangular cross section. Preferably, the washer further has similar skirt portions formed on the other of its opposite faces and an annular fin generally axially extended from the radially inner skirt portion on one of its opposite faces.

These and other objects, features and advantages of this invention are evident from the following description with aid of the accompanying drawing, of a preferred embodiment of this invention.

DESCRIPTION OF THE PREFERRED EMBODIMENT

Figure 1:
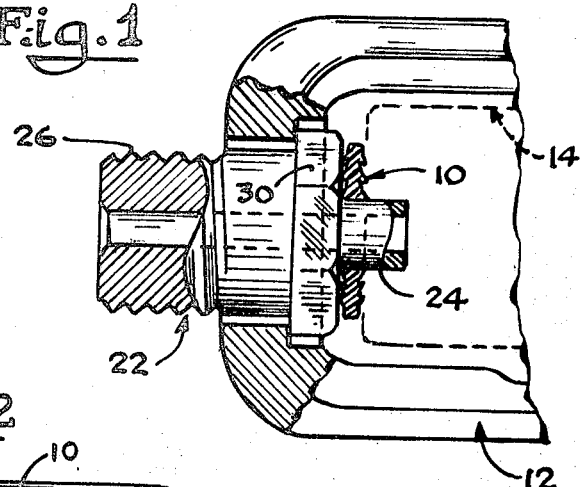
FIG. 1 is a plan view, partly broken away, showing a washer embodying the principles of this invention in combination with a swivel yoke and associated parts useful in connecting a gas pressure regulator to a valve body such as may be mounted on a cylinder containing medical oxygen or other gas under pressure.
Figure 2:
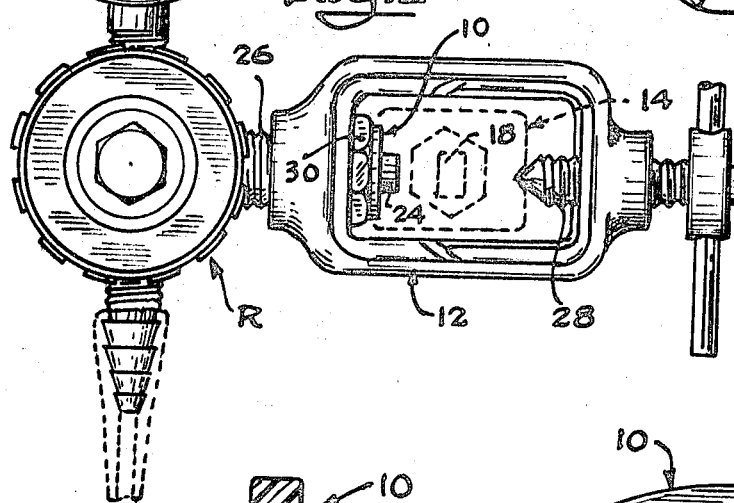
FIG. 2 is a plan view of the subject matter of FIG. 1 further showing a gas pressure regulator in full lines and a valve body in phantom lines.
Figure 3:
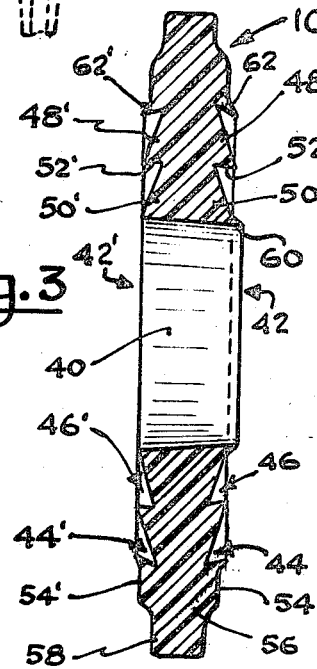
FIG. 3 is a diametrical sectional view of the washer of FIG. 1.
Figure 4:
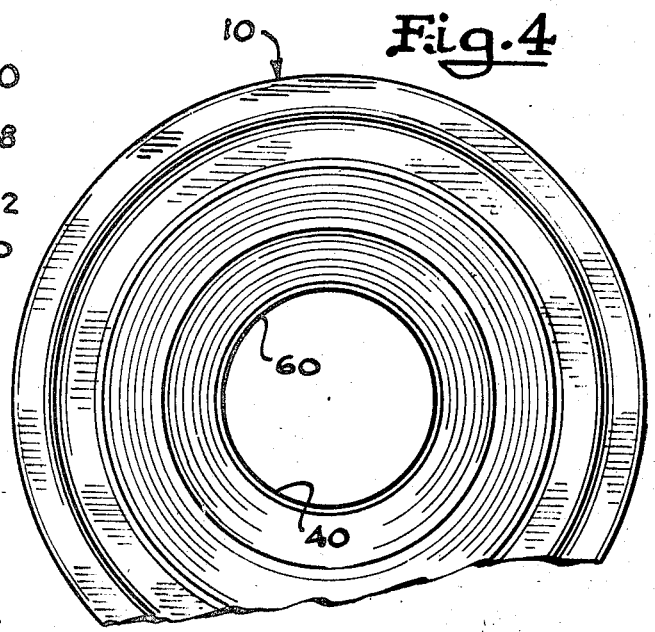
FIG. 4 is an elevational view, partly broken away, taken from the right side of FIG. 3.

In the drawing, a washer 10, which constitutes a preferred embodiment of this invention, is shown in combination with a swivel yoke 12 and other parts used in connecting a gas pressure regulator R to a valve body 14 mounted to a cylinder (not shown) containing medical oxygen or other gas under high pressure. The valve body 14 incorporates suitable valve means (not shown) for selectively permitting and stopping flow of the gas from the cylinder as determined by the position of a valve stem 18 rotatable by means of a suitable handle or key (not shown). A stem 22, which has a nipple 24 adapted to be drawn into a valve outlet opening (not shown) in the body 14, is threadably connected to the gas pressure regulator R at a threaded base 26. The swivel yoke 12 is used to mount the stem 22 to the valve body 14 such that the nipple 24 is drawn into the valve opening. In order to make a high-pressure gastight connection, a threaded stud 28 is used to draw the nipple 24 into the valve outlet opening, as shown, and the washer 10 is disposed around the nipple 24 between an enlarged head 30 on the stem 22 and the margin of the valve outlet opening. The foregoing arrangement of parts, other than the washer 10, is similar to an arrangement of parts described in detail in the aforementioned copending Pat. application, Ser. No. 812,183, filed Apr. 1, 1968, and assigned to the assignee of the present application. The washer 10 is used in place of a flat-faced washer shown in such copending application. Reference may be had to such copending application for further details of the remaining parts. The washer 10 may be used with yokes of other types.

The washer 10, which is molded or otherwise suitably fabricated in one piece of resiliently deformable material such as nylon, is annular and has an axial opening 40 and opposite faces 42 and 42', respectively. When the washer 10 is in place, as mentioned, the axial opening 40 admits the nipple 24, and the faces 42 and 42' respectively engage the margin of the valve outlet opening in the valve body 14 and the enlarged head 30 on the stem 22.

In accordance with the principles of this invention, the washer 10 has in the face 42 radially outer and inner coaxial annular grooves, 44 and 46 respectively, which together with the axial opening 40 form radially outer and inner skirt portions, 48 and 50 respectively, of generally triangular cross section. Preferably, as shown, the washer 10 further has in the face 42' similar radially outer and inner grooves, 44' and 46' respectively, which together with the axial opening 40 form similar radially outer and inner skirt portions, 48' and 50' respectively, of generally triangular cross section. Preferably, the radially inner surfaces 52 and 52' respectively, of the radially outer skirt portions 48 and 48' are undercut as by approximately 5° from the axis of the washer 10.

When the washer 10 is in place in the aforementioned arrangement of parts, both the radially outer skirt portions 48 and 48' and the radially inner skirt portions 50 and 50' are resiliently deformed between the margin of the valve outlet opening in the valve body 14 and the enlarged head 30 on the stem 22. Thus, any leakage that may occur between radially inner skirt portion 50 and the margin of the valve outlet opening in the valve body 14 will be blocked by means of the radially outer skirt portion 48, and any leakage that may occur between the radially inner skirt portion 50' and the enlarged head 30 on the stem 22 will be blocked by means of the radially outer skirt portion 48'. The undercutting of the surfaces 52 and 52' permits the radially outer skirt portions 48 and 48' to be flexed toward the axis of the washer 10 when resiliently deformed. Thus, the pressure of any gas entering the grooves 46 and 46' will tend to cause the radially outer skirt portions 48 and 48' to be flexed oppositely in aid of the sealing function of the washer 10.

In the washer 10, as shown, the axial component of the deformation of the radially outer skirt portions 48 and 48' and of the radially inner skirt portions 50 and 50' is limited by opposite flat surfaces 54 and 54' respectively, of an annular portion 56 disposed radially outwardly of the radially outer skirt portions 48 and 48', and the axial width of the washer 10 is slightly less at the limiting portion 56 than either at the radially outer skirt portions 48 and 48' or at the radially inner skirt portions 50 and 50'. As the nipple 24 is further drawn into place, the limiting portion 56 may be axially compressed between the margin of the valve outlet opening in the valve body 14 and the enlarged head 30 on the stem 22 such that peripheral expansion of the washer 10 results.

As shown, the washer 10 further has an annular peripheral reinforcing portion 58 disposed radially outwardly of the limiting portion 56 to absorb some of the stress of peripheral expansion of the washer 10. In order to minimize axial compression of the reinforcing portion 58, the axial width of the washer 10 is substantially less at the reinforcing portion 58 than at the limiting portion 56. If desired, the washer 10 may be additionally reinforced as by means of a peripheral metal band or the like (not shown).

As shown, the washer 10 further has an annular fin 60 generally axially extended from the radially inner skirt portion 50, and the axial opening 40 is generally conical and of lesser diameter at the end adjacent the fin 60 than at the other end. Preferably, the mean diameter of the axial opening 40 is substantially equal to the diameter of the nipple 24. Thus, the nipple 24 may be passed easily into the axial opening 40 from the larger end of the axial opening 40, yet the smaller end of the axial opening 40 will have negative clearance with the nipple 24 adjacent the fin 60 to eliminate leakage between the nipple 24 and the washer 10. The fin 60 is adapted to fit within the valve outlet opening of the valve body 14 around the nipple 24 to seal the valve outlet opening except for the nipple 24. Thus, the pressure of any gas entering the grooves 46 and 46' will tend to press the fin 60 against the nipple 24 in aid of the sealing function of the washer 10.

Preferably, as shown, an annular fin 62 is axially extended from the limiting portion 56 at the radially outer groove 44 in the face 42, and a similar annular fin 62' is axially extended from the limiting portion 56 at the radially outer groove 44' in the face 42'. Preferably, the respective radially inner surfaces (not numbered) of the fins 62 and 62' are undercut approximately as are the aforementioned radially inner surfaces 52 and 52', and the axial width of the washer 10 is approximately equal both at the fins 62 and 62' and at the radially outer skirt portions 48 and 48'.

When the washer 10 is in place in the aforementioned arrangement of parts, the fins 62 and 62' are resiliently deformed together with the radially outer skirt portions 48 and 48'. Thus, any leakage that may occur between the radially outer skirt portion 48 and the margin of the valve outlet opening in the valve body 14 will be blocked by means of the fin 62, and any leakage that may occur between the radially outer skirt portion 48' and the enlarged head 30 on the stem 22 will be blocked by means of the fin 62'. The undercutting of the respective radially inner surfaces of the fins 60 and 62' permits the fins 62 and 62' to be flexed toward the axis of the washer 10 when resiliently deformed. Thus, the pressure of any gas entering the grooves 44 and 44' will tend to cause the fins 62 and 62' to be flexed oppositely in aid of the sealing function of the washer 10.

Because the pressure of any gas entering either the grooves 44 and 44' or the grooves 46 and 46' tends to aid the sealing function of the washer, as aforementioned, it is not necessary to wrench tighten the parts between which the washer 10 is disposed. Rather, the washer 10 is self-sealing. In like manner, the number of radially spaced annular grooves in either or both of the opposite faces of such a washer may be increased, if desired, for conditions of high pressure more extreme than those likely to be found in the preceding example.

Thus, it will be appreciated that all of the recited objects, advantages and features of this invention have been demonstrated as obtainable in a highly practical apparatus and one that is simple and positive in operation. It will be further understood that although this invention has been described with respect to certain specific embodiments thereof, this invention is not limited thereto, since various modifications of said invention will suggest themselves from the aforesaid description and are intended to be encompassed within the scope of the appended claims wherein there is claimed.

I claim:

1. A one-piece annular washer of resiliently deformable material having in at least one of its opposite faces radially outer and inner coaxial annular grooves, which together with the axial opening of said washer form radially outer and inner coaxial annular skirt portions of generally triangular cross section, and having an annular fin generally axially extended from the radially inner skirt portion, the axial width of said washer being greater at said fin than at said radially inner skirt portion.

2. The washer of claim 1 further having an annular portion limiting axial deformation of said skirt portions, the axial width of said washer being slightly less at said limiting portion than either at said radially outer skirt portion or at said radially inner skirt portion.

3. The washer of claim 2 wherein said limiting portion is disposed radially outwardly of said skirt portions and radially inwardly of an annular peripheral reinforcing portion.

4. The washer of claim 1 wherein the radially inner surface of said radially outer skirt portion is undercut.

5. The washer of claim 1 wherein the axial opening is generally conical and of lesser diameter at the end adjacent said fin than at the other end.

6. The washer of claim 1 wherein similar skirt portions are formed on the other of its opposite faces and wherein the axial opening is generally conical and of lesser diameter at the end adjacent said fin than at the other end.

7. The washer of claim 6 wherein the radially inner surfaces of the respective radially outer skirt portions are undercut.

8. The washer of claim 1 further having an annular portion limiting axial deformation of said skirt portions, the axial width of said washer being slightly less at said limiting portion than either at said radially outer skirt portion or at said radially inner skirt portion, and having an annular fin axially extended from said limiting portion, the axial width of said washer being approximately equal both at said fin which extends from said limiting portion and at said radially outer skirt portion.

9. The washer of claim 8 wherein the radially inner surface of the fin axially extended from said limiting portion is undercut.

10. The washer of claim 9 wherein the radially inner surface of said radially outer skirt portion is undercut.

11. The washer of claim 8 wherein similar skirt portions and a fin similar to the fin axially extended from said limiting portion are formed on the other of its opposite faces.

12. The washer of claim 11 wherein the radially inner surfaces both of said similar radially outer skirt portions and of said similar fins are undercut.

* * * * *